July 11, 1961     D. MULLAN     2,992,058
CONVEYOR TYPE BASING AND SEASONING MACHINE
Filed Feb. 13, 1956     7 Sheets-Sheet 1
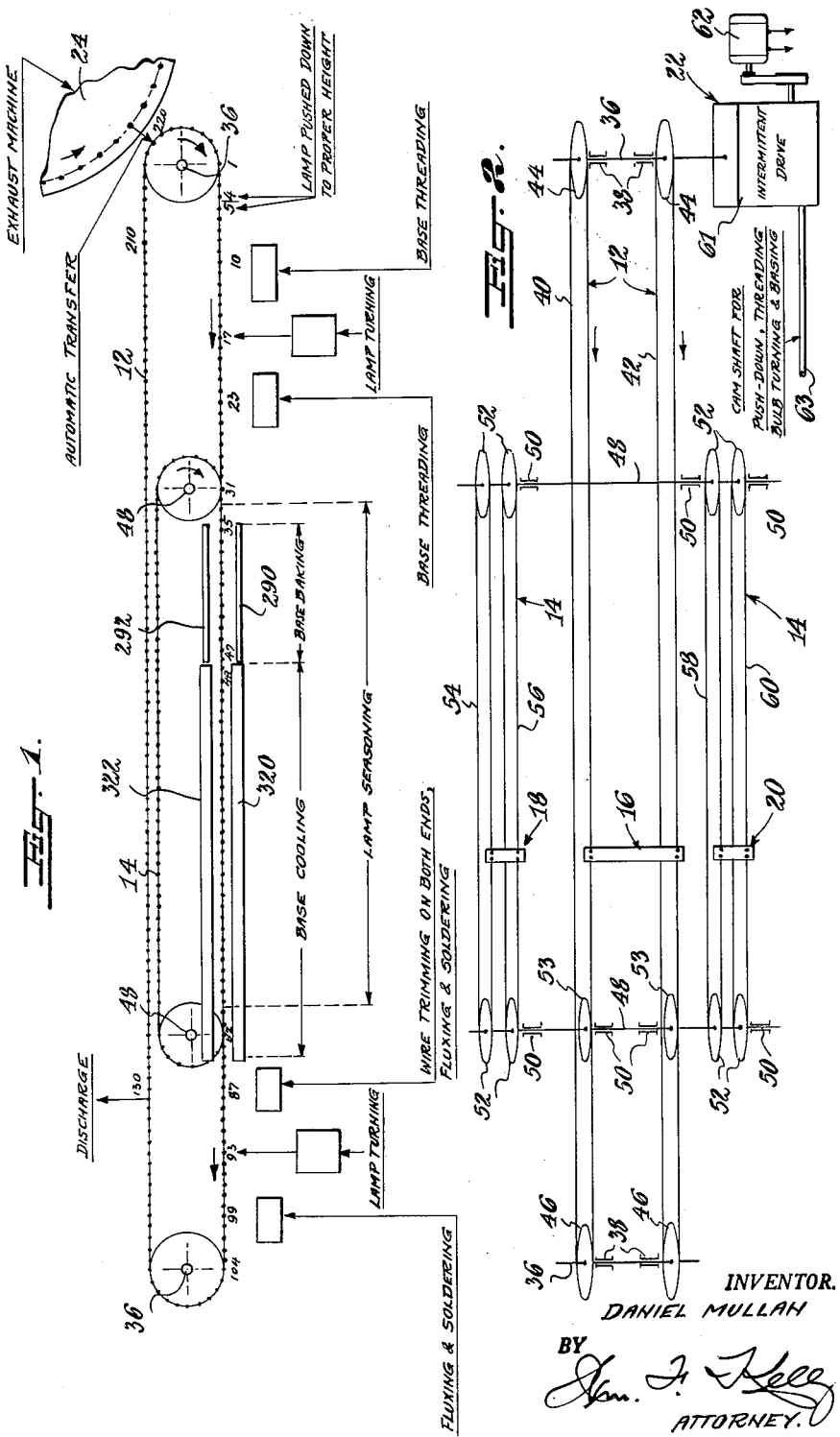
INVENTOR.
DANIEL MULLAN
BY
ATTORNEY.

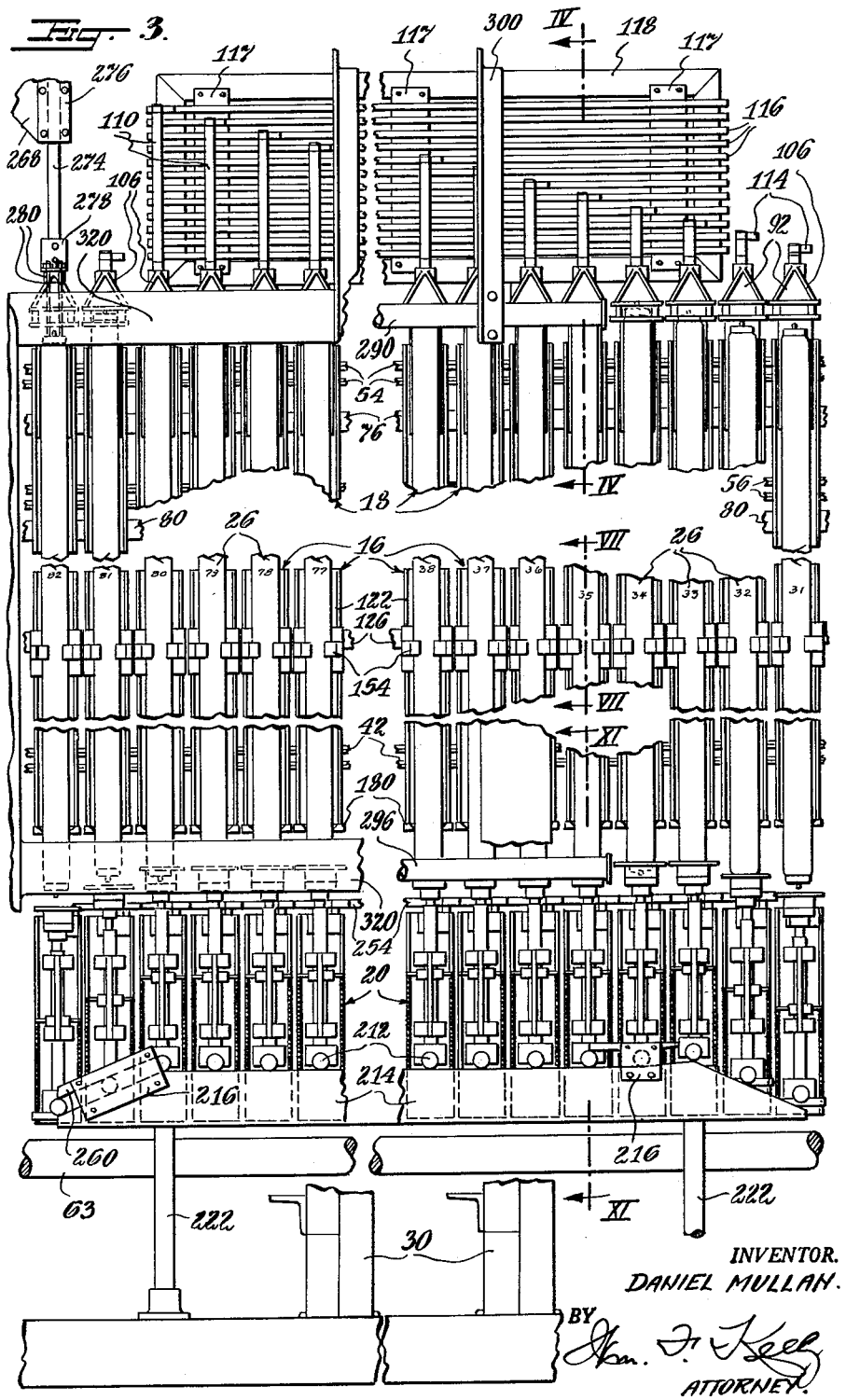

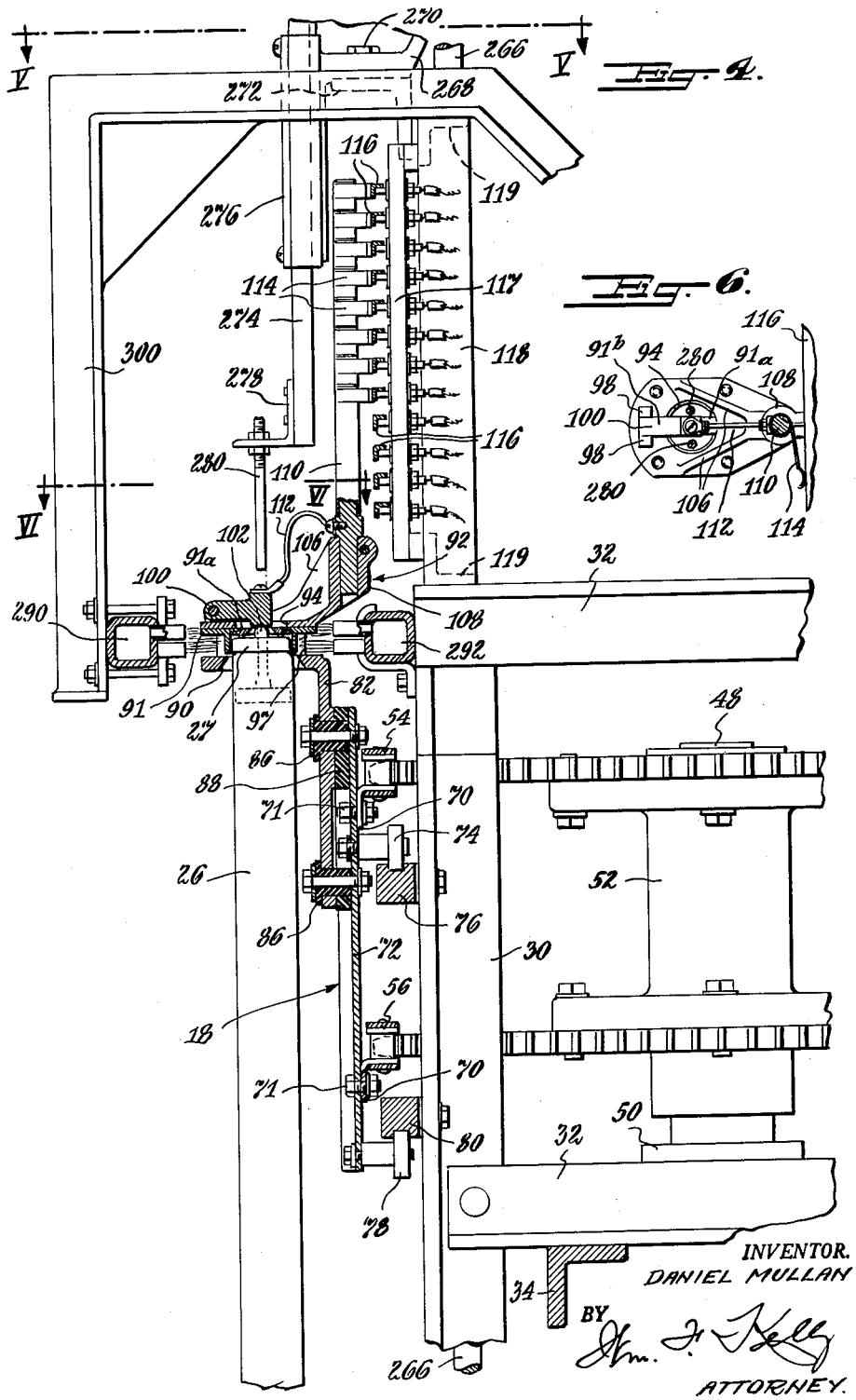

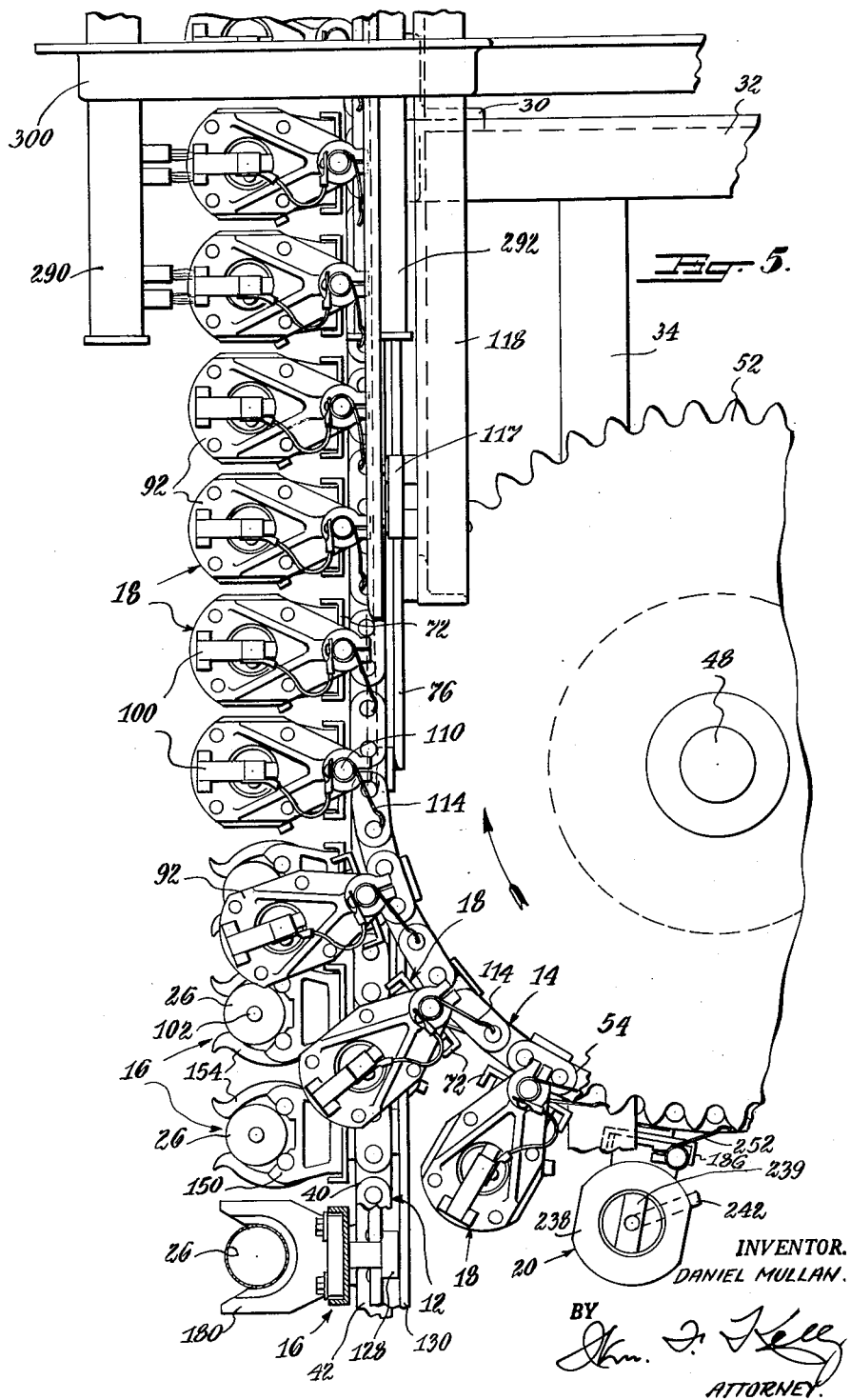

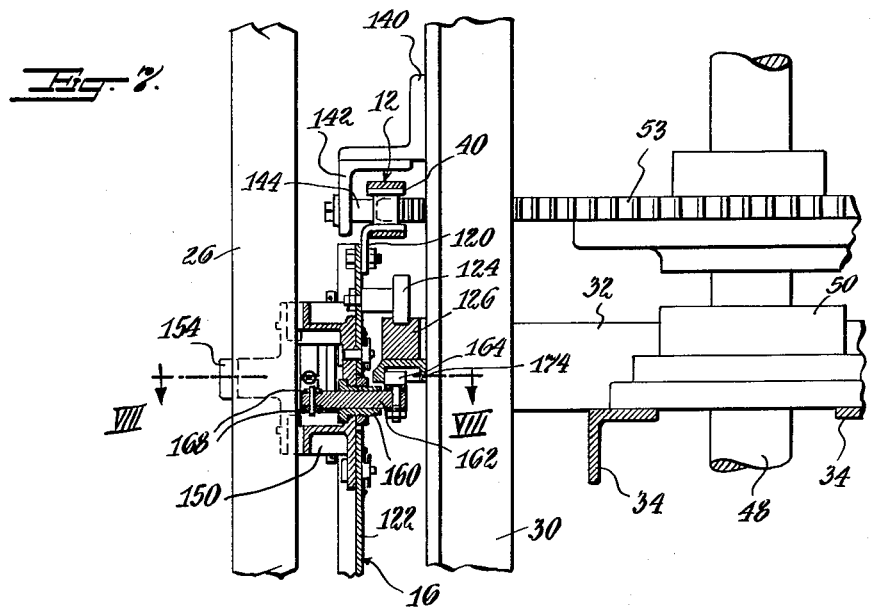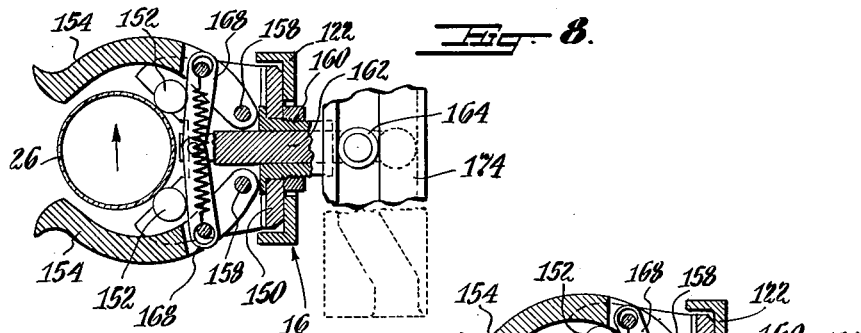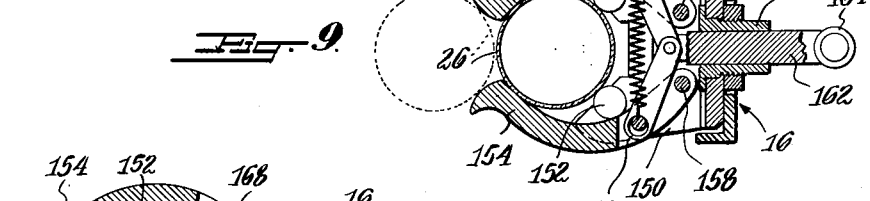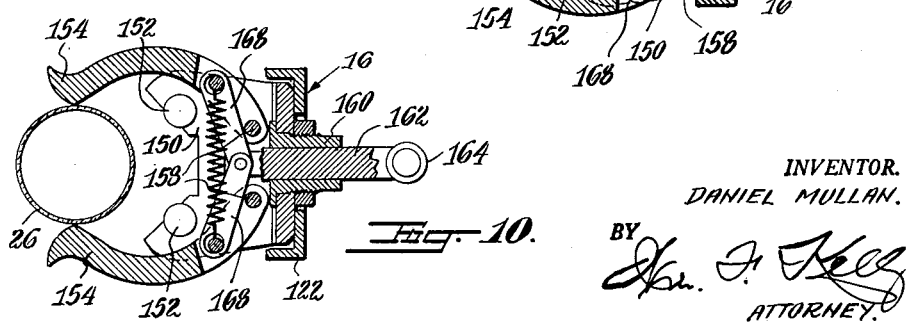

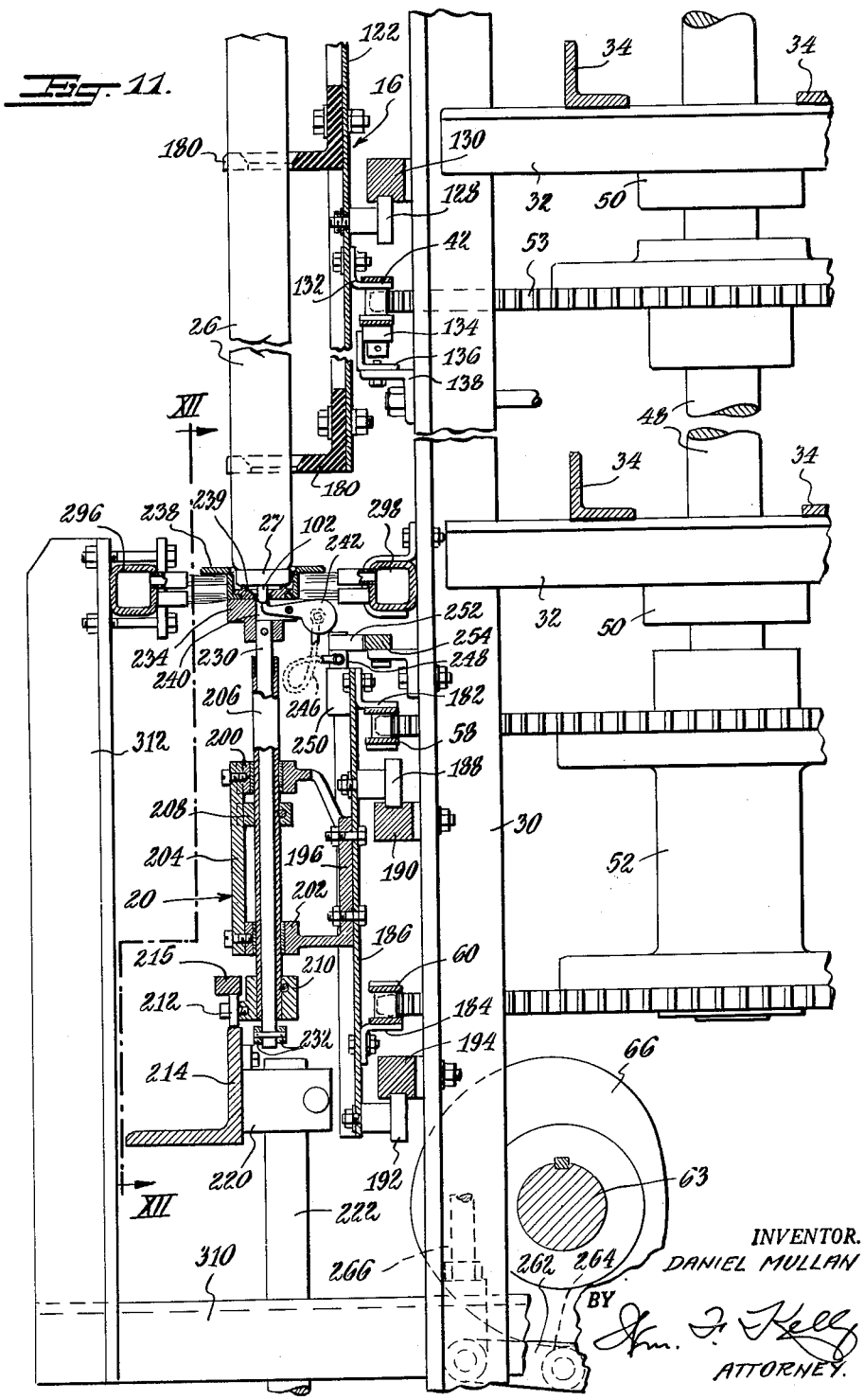

July 11, 1961 D. MULLAN 2,992,058
CONVEYOR TYPE BASING AND SEASONING MACHINE
Filed Feb. 13, 1956 7 Sheets-Sheet 7
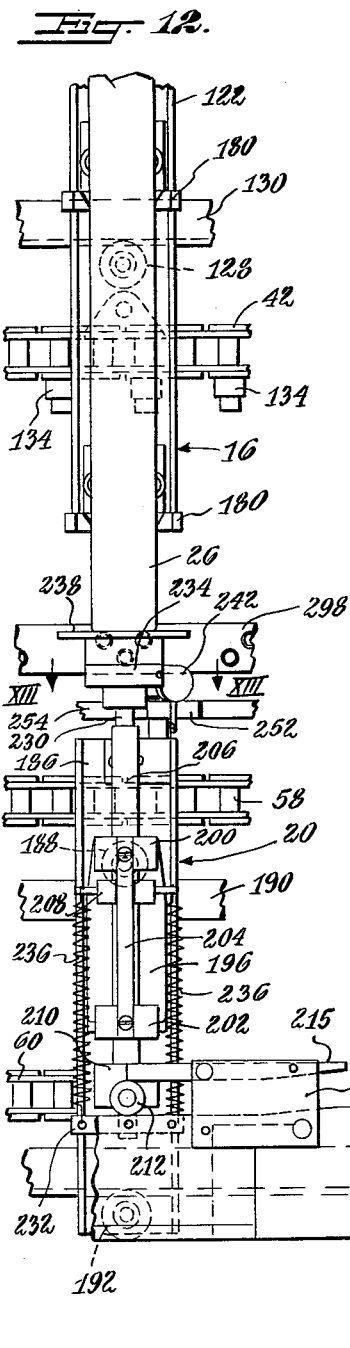
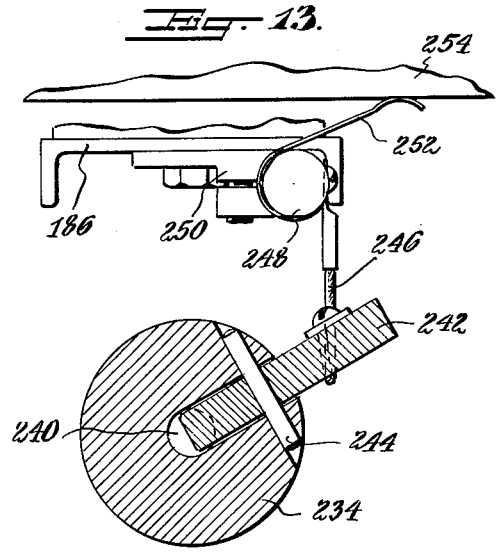
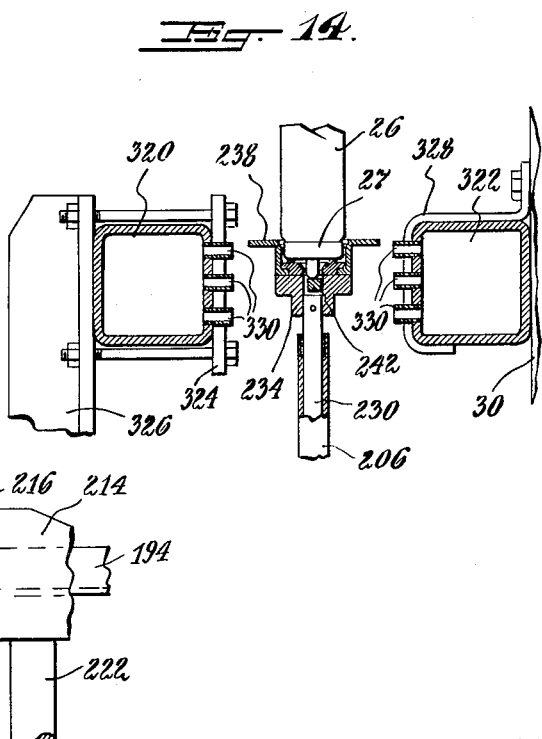
INVENTOR.
DANIEL MULLAN.
BY
ATTORNEY.

United States Patent Office 2,992,058
Patented July 11, 1961

2,992,058
CONVEYOR TYPE BASING AND SEASONING MACHINE
Daniel Mullan, Hillside, N.J., assignor to Westinghouse Electric Corporation, East Pittsburgh, Pa., a corporation of Pennsylvania
Filed Feb. 13, 1956, Ser. No. 565,097
9 Claims. (Cl. 316—32)

The present invention relates to the manufacture of fluorescent lamps and, more particularly, to a conveyor type basing and seasoning machine for such lamps.

The prior art rotary turret basing and seasoning machines, as exemplified by the lamp making machine disclosed in U.S. Patent No. 2,069,386 issued February 2, 1937, to C. B. Palucki and assigned to Alfred Hofmann and Company, is not capable of keeping up with the other present day component machines of a high speed fluorescent lamp manufacturing group.

Hence, it has been found advantageous according to the present invention to provide a novel conveyor type basing and seasoning machine comprising essentially an outer and an inner conveyor. The outer conveyor receives a fluorescent lamp from the adjacent exhaust machine and delivers the lamp successively through a positioning station, base threading station, lamp inverting station, base threading station and transfer station for delivery to the inner conveyor. This inner conveyor transports the lamp through a plurality of work stations where the lamp base is baked and then cooled (while simultaneously being seasoned) and then is returned to said outer conveyor. The outer conveyor carries the lamp thereon through a station where the wire on both ends of the lamp is trimmed and one end is fluxed and soldered, a lamp inverting station and a station for the fluxing and soldering of the other end. Finally the lamp is transferred from the outer conveyor to an adjacent lamp inspecting and testing machine or is delivered by said outer conveyor to inspecting and testing stations located adjacent said outer conveyor.

The invention also contemplates a novel outer conveyor comprising outer chains for securing the lamp near its midpoint and for guiding the lower end thereof and an inner conveyor provided with an upper base-head-carrying-chain and a lower base-head-carrying-chain.

In its general aspect the present invention has as its objective, a dual conveyor type basing and seasoning machine for fluorescent lamps.

A specific object of the present invention is a conveyor type basing and seasoning machine comprising an outer conveyor for supporting the lamp along its mid-point and guiding the lower end thereof and an inner conveyor comprising an upper head supporting chain and a lower head supporting chain.

Other objects of the invention will become apparent to those skilled in the art to which it appertains as the description thereof proceeds both by direct recitation and implication from the context.

Referring now to the drawings in which like numerals of reference indicate similar parts throughout the several views:

FIG. 1 is a diagrammatic plan view of a dual conveyor type basing and seasoning machine of the invention and a portion of an adjacent exhaust machine.

FIG. 2 is a diagrammatic perspective view of the driving mechanism and the outer and inner conveyors of the basing and seasoning machine of the invention.

FIG. 3 is a front elevational view of the conveyor type basing and seasoning machine adjacent to the base baking, base cooling and lamp seasoning stations comprising stations 31 through 82 thereof, and broken away to eliminate unnecessary repetitious details thereof.

FIG. 4 is a vertical sectional view of the conveyor type basing and seasoning machine (at station 35) along the line IV—IV of FIG. 3 in the direction of the arrows and showing the details of the upper chains of the inner conveyor, the upper basing heads and associated seasoning connections.

FIG. 5 is a horizontal plan view along the line V—V of FIG. 4 in the direction of the arrows and showing the details of the upper basing heads on the upper chains of the inner conveyor and also the details of the lamp holder and the lamp guides on the respective chains of the outer conveyor.

FIG. 6 is a fragmentary horizontal sectional view of the upper base receiving head along the line VI—VI of FIG. 4 in the direction of the arrows, and showing the associated electrical connections thereof.

FIG. 7 is a vertical sectional view (similar to FIG. 4) along the line VII—VII of FIG. 3 of the lamp bulb holder at station 35 carried by the upper chain of the outer conveyor.

FIG. 8 is a horizontal sectional view along the line VIII—VIII of FIG. 7 of the bulb holder in the open position (after station 33) maintained during the base baking and seasoning operation.

FIG. 9 is a view similar to FIG. 8 of the bulb holder in the closed position maintained before station 33 and after station 82.

FIG. 10 is a view similar to FIGS. 8 and 9 showing the jaws of the bulb holder in the transfer position at station 220 and discharge position at station 130 indicated diagrammatically in FIG. 1.

FIG. 11 is a vertical sectional view (similar to FIGS. 4 and 7) along the line XI—XI of FIG. 3 and showing the lower basing head carrying chains and its associated drive mechanism as well as the associated electrical connections thereof at station 35.

FIG. 12 is a vertical sectional view along the line XII—XII of FIG. 11 in the direction of the arrows and showing the details of the lower basing heads and the associated lower base head elevating mechanism.

FIG. 13 is a horizontal sectional view of a lower basing head along the line XIII—XIII of FIG. 1 in the direction of the arrows and showing the electrical connections for a lower base head.

FIG. 14 is a vertical sectional view of the cooling manifold and the lower base holder head along the line XIV—XIV of FIG. 3 at station 79.

Referring now to the drawings and particularly to FIG. 1, a dual conveyor type basing and seasoning machine of the invention is shown therein. This machine (FIGS. 1 and 2) has an outer conveyor 12 and an inner conveyor 14 provided respectively with a plurality of lamp bulb holder heads or lamp holders 16 (FIGS. 2, 3 and 7–10) and a further plurality of upper base holder heads 18 (FIGS. 2–6) and lower base holder heads 20 (FIGS. 2, 3 and 12–14) which are all indexable about a frame through a plurality of work stations by a suitable drive mechanism 22 (FIG. 2).

GENERAL OPERATION

At station 220 (FIG. 1) an exhausted fluorescent lamp 26 (FIGS. 3, 4, 7, 11, 12 and 14) may be automatically transferred by conventional means (not shown) from a head of an exhaust machine 24 to a lamp holder 16 of the outer conveyor 12. At stations 4 and 5 the lamp 26 may be pushed down, manually or by automatic means (not shown), to position the lamp 26 to the proper heighth above the holders 16 for performing the lamp basing operations at one end. At station 10 a base may be threaded on one end of the lamp 26 by apparatus for threading bases on the leads of fluorescent lamps such as disclosed in U.S. Patent No. 2,720,690 issued to Daniel Mullan et al. October 18, 1955 and assigned to the same assignee as the subject application. The lamp 26 may be inverted at station 17 by a machine for turning fluorescent lamps and other elongated devices end for end as described in U.S. Patent No. 2,661,101 issued to Daniel Mullan et al. on December 1, 1953 and assigned to the same assignee as the present application. After inversion, the lamp 26 may have a base 27 (FIGS. 4 and 11) suitably threaded thereon at station 23 by apparatus similar to the above described base threading apparatus at station 10.

At station 31 (FIGS. 1, 3 and 5) the upper basing heads 18 and lower basing heads 20 of the inner conveyor 14 automatically align themselves with the lamp 26, as hereinafter related in detail. At station 32 (FIG. 3) the lamp 26 is seated in a lower basing head 20 and in an upper basing head 18 by a lamp elevating mechanism, such as shown in FIG. 3 at station 34. The lamp bulb holders 16 of the outer chain 14 are opened at station 33 (FIG. 8) and the lamp 26 (secured in the upper base head 18 and lower base head 20 at station 34) undergoes base baking (for 13 stations) from station 35 through station 47. From station 48 through station 84 (37 stations) the lamp 26 is cooled. During index between stations 80 and 81 the lamp bulb holder 16 once more grasps the lamp 26. The lower basing head 20 is lowered at stations 81 and 82 (reaching its lowermost position at station 82) and the lamp 26 pushed from the upper basing head 18 at station 82.

At station 87 the lamp 26 (once more secured in the lamp holder 16 of the outer conveyor 12) may have the lead wires trimmed at both ends and the lead wires at one end fluxed and soldered by apparatus for trimming, fluxing and soldering the lead wires of fluorescent lamps as disclosed in U.S. Patent No. 2,764,953 issued Oct. 2, 1956 to Daniel Mullan and assigned to the same assignee as the subject application.

At station 93, for example, the lamp 26 may once more be inverted by a lamp turning apparatus such as is located at station 17. The lead wires of the other end of the lamp 26 may be fluxed and soldered at station 99 by apparatus similar to the device at station 87. At station 130, for example, the lamp 26 may be transferred by automatic means (not shown) to an automatic inspection and testing machine (not shown) adjacent thereto. Alternatively fluorescent lamp inspection devices and automatic testing devices (not shown) located adjacent stations 130 through 210 on the outer conveyor 12 may be employed.

*Frame*

The frame of the dual conveyor type basing and seasoning machine has a plurality of pairs of vertical legs 30 (FIGS. 3, 4, 5, 11 and 14) which are maintained in substantially parallel relationship by a series of horizontal channels or angles 32, five in the instant showing of FIGS. 4, 7 and 11. The horizontal channels 32 carry a plurality of pairs of substantially parallel longitudinal angles or channels 34, five of which are shown in FIGS. 4, 7 and 11.

*Conveyors*

As shown particularly in FIGS. 1, 2, 4, 7 and 11 the outer conveyor 12 of the conveyor type basing and seasoning machine of the invention, has a vertical drive shaft 36 (FIG. 2) journalled in suitable bearings 38 (for example two in FIG. 2) which are carried by the longitudinal channel members 34 of the frame. The outer conveyor 12 has an upper chain 40 and a lower chain 42 (FIG. 2) for supporting as hereinafter described, the bulb holders 16. The chains 40 (FIG. 7) and 42 (FIG. 11) are driven by drive sprockets 44 on the shaft 36 by the drive mechanism 22 and pass around idler sprockets 46 (FIG. 2) at the other end of the machine, suitably on a shaft 36 and journalled in a pair of suitable bearings 38 (FIG. 2).

The inner conveyor 14 has a pair of vertical shafts 48 (FIGS. 1, 2, 4, 7 and 11) suitably journalled in a plurality of bearings 50, seven in the present showing of FIG. 2, which are carried by the longitudinal support members or angles 34 of the frame of the basing and seasoning machine. It will be understood from a consideration of FIG. 2 that the right hand shaft 48 (when viewed therein) is suitably journalled in three bearings 50, supported by the longitudinal members 34. The right hand and left hand shafts 48 (when viewed in FIG. 2) each carry two double sprockets 52 thereon. The left hand shaft 48 (when viewed in FIG. 2) carries a pair of middle drive sprockets 53 in engagement with the outer chains 40 and 42 of the outer conveyor 12.

From a consideration of FIG. 1 it is apparent that the sprockets 52 and 53 of the inner conveyor 14 are suitably smaller in pitch diameter than the sprockets 44 and 46 of the outer conveyor 12, in order to provide the proper vertical alignment of the upper basing heads 18 and the lower basing heads 20 with the similarly spaced bulb holders 16 only between stations 31 and 82. A pair of upper chains 54, 56 (FIGS. 4 and 5) rotate about the upper sprockets 52 and carry the upper basing heads 18 thereon. The middle drive sprockets 53 (FIGS. 2, 7 and 11) on the left hand shaft 48 engage the outer chains 40 and 42 respectively and the inner conveyor 14 is driven thereby. In turn lower chains 58 and 60 (FIG. 11) rotate about the lower sprockets 52 and carry the lower basing heads 20 thereon.

*Conveyor drive*

The drive mechanism 22 for the conveyor type basing and seasoning machine comprises a conventional intermittent drive 61, of the type shown in the above mentioned U.S. Patent No. 2,764,953, suitably driven by a motor 62 (FIG. 2) and provided with a longitudinal cam shaft 63 (FIGS. 2, 3 and 11). The shaft 63 extends from the intermittent drive 61 and carries a pushdown or ejector cam 66 for pushing a based lamp 26 out of the upper basing head 18 and cams (not shown) for operating the threading apparatus (not shown) the bulb inverting apparatus and wire trimming, fluxing and soldering apparatus (not shown), as hereinbefore mentioned.

*Upper basing heads 18*

As shown particularly in FIG. 4, the upper chains 54 and 56 are provided with angle type bottom chain links 70 for adjustable securement thereto (by means of bolts 71) of an upper basing head mounting channel 72. This channel 72 carries a top roller 74 in engagement with the top surface of a stationary guide track 76 (FIG. 4) and a bottom roller 78 in engagement with the bottom surface of a similar guide track 80 to stiffen each of the upper basing heads 18 which are spaced the same distance apart as the lamp holders 16 (FIGS. 4 and 5) and to assure their aligned indexing travel from station to station. The tracks 76 and 80 are carried by the legs 30 of the machine frame.

A head mounting bracket or angle 82 is secured to the upper portions of the channel 72 by means of bolts as shown in FIG. 4, and is suitably insulated from said channel 72 (or the machine frame) by means of the insulating bushings 86 and an insulating plate 88. The plate 88 is suitably provided with a clearance slot therein (FIG. 4) for the bolts 71 used to mount the channel 72 on the links 70. This mounting bracket or angle 82 is provided with a bevelled aperture 90 for insertion therein of a lamp 26 as hereinafter explained. A flanged inverted cup like body or head 91, provided with a replaceable base supporting insert 91a for a one pin base (in this case), is carried by the bracket 82. The insert 91a has a radial bridge 91b (FIG. 6) which bridges the opening in the head body 91.

A seasoning contact casting 92 suitably provided with an axial contact (and push down operating finger) opening 94 (FIG. 6) may be secured to the head 91 and the bracket 82, as by means of bolts extending through a plurality (four in the present showing of FIG. 4) of spacers 97. This casting 92 is provided with lugs 98 (FIG. 6) for pivotably mounting thereon a weighted contact lever 100 whose lower end depends through contact hole 94 and normally engages a contact 102 of the base 27 of a lamp 26 (FIG. 4). This casting 92 is suitably provided with angular ribs 106 which sweep upwardly and converge on the right hand end thereof, when viewed in FIGS. 3, 4 and 6, to provide a suitable socket 108 (FIG. 4) for mounting therein a seasoning bus bar contact mounting rod 110. The contact lever 100 (FIGS. 3, 4 and 6) is connected to the mount rod 110 by a flexible conductor 112. A brush or contact finger 114 is carried on the upper end of each of the staggered mount rods 110 and is held in spring-biased engagement with one of a plurality of seasoning bus bars 116, 12 in the present showing of FIG. 3. It is apparent from a consideration of FIG. 3, that the heights of the contact mount rods 110 are staggered so that the brushes 114 carried on the upper ends thereof engage one and only one of the substantially parallel bus bars 116 and hence only one lamp 26 is seasoned on each identical seasoning circuit (not shown) to assure uniform seasoning of all lamps 26.

As shown in FIGS. 3 and 4 the bus bars 116 are carried by insulating supports 117 (FIG. 4) of a metallic supporting frame 118 mounted by brackets 119 on the leg 30 and the channel 32.

*Bulb holder heads 16*

The top driver chain 40 of the outer conveyor 12 (FIG. 7) is provided with angle type links 120 (similar to the links 70, FIG. 4) to which a bulb holder supporting channel 122 (FIGS. 11 and 12) is secured, as by bolts. This channel 122 carries a top roller 124 (FIG. 7) in engagement with the top surface of a guide track 126 (similar to the guide track 76, FIG. 4) and a bottom roller 128 in engagement with the bottom surface of a guide track 130, FIG. 11 (similar to the bottom track 80, FIG. 4). The lower driver chain 42 likewise is provided with upper angle type links 132 for securement, as by bolts, to the lower portions of the channel 122 (FIG. 11).

The bottom portion of the link pins of the chain 42 are provided with thrust rollers 134 for engagement with a lower thrust roller shoe 136 carried by a bracket 138 secured to the leg 30 of the machine frame adjacent stations 81, 82, and 83. In like manner (FIG. 7) an angular supporting bracket 140 is secured to the leg 30 and carries an upper chain thrust shoe mounting bracket 142 on which is mounted a thrust shoe 144 for engagement with the link pin portion of the driver chain 40 (FIG. 7). It will be understood that the upper thrust shoe 144 and the lower thrust shoe 136 extend from the frame of the machine contiguous to stations 81, 82 and 83 (FIG. 1) to prevent whipping of the lamp 26 due to back lash in the indexing mechanism 61 (FIG. 2) during the transfer of a lamp 26 from the upper and lower basing heads 18 and 20 of the inner conveyor 12 at these stations to the lamp holders 16 of the outer conveyor 12.

Each bulb holder 16 has a centralizing mounting bracket 150 (FIGS. 5, 7, 8, 9 and 10) secured, as by bolts, to the supporting channel 122 thereof. This bracket 150 is provided with a pair of plastic centralizing rods 152, suitably nylon, for engaging the heated envelope of the lamp 26 and centralizing same with respect to the axis of the bulb holder 16. Jaws 154 are pivoted on pins 158 upstanding from the centralizing mounting bracket 150. A plunger bushing 160 is suitably secured within the mounting bracket 150, as by a threaded connection (FIGS. 8 through 10) and slidably carries therein a jaw operating plunger 162 having a cam engaging roller 164 on its right hand end, when viewed in FIG. 8. This operating plunger 162 carries an upstanding pivot or pin on its left hand end for pivotably mounting thereon a pair of links 168. These links are spring-biased into normally closed engagement and have their outer ends pivotably connected to the jaws 154 through suitable clearance slots in said jaws.

It will be understood from a consideration of FIG. 9, that when the jaws 154 are in the normally closed position shown therein, the links 168 are beyond the dead center position of their pivot. The jaws 154 open between stations 33 and 34 by the roller 164 (during index) riding up an inclined portion of a stationary cam 174 (FIGS. 7 and 8) carried by the leg 30 of the frame beneath the tracks 126 for top roller 124 on channel 122. The jaws 154 remain open (past dead center position FIG. 8) from stations 35 to 80 whereupon the roller 164 rides down an incline in the cam 174 thus closing the jaws 154 about a lamp 26. From a consideration of FIG. 10 it is apparent that the spring-biased jaws 154 will not be swung (without the aid of means such as the cam 174) beyond the dead center position of the links 168 merely by introducing or withdrawing a lamp 26 from the holder 16 at the transfer position or discharge position, shown in FIG. 1 of the combination basing and seasoning machine.

As shown in FIGS. 3, 11 and 12, the bottom portion of the supporting channel 122 carries a pair of lamp guides 180 which are generally U-shaped in horizontal cross-section and contoured to guidingly support the lower portions of a lamp 26 while held in the bulb holder 16 of the outer conveyor 12.

*Lower basing heads 20*

Each of the lower basing heads 20 (FIGS. 2, 3, 11, 12, 13 and 14) is carried by the lower chains 58 and 60. The lower chains 58 and 60 have respectively a plurality of angle type upper links 182 and lower links 184 (FIG. 11) which carry, by means of bolts, a lower basing head supporting channel 186. As in the case of the upper basing heads 18 and the lamp holders 16 (FIGS. 4 and 7) the supporting channel 186 is provided with an upper roller 188 in engagement with the top surface of the cam track 190 carried by the leg 30 of the machine frame and a lower roller 192 in engagement with the bottom surface of a cam track 194 likewise secured to the leg 30 of the machine frame.

A head elevating mechanism mount casting 196 (FIG. 11) is fixed to the channel 186, as by bolts. This mounting casting 196 consists essentially of an upper bearing 200 and a lower bearing 202 integrated by a vertical key-plate 204. A hollow sleeve 206 (FIG. 11) is reciprocable in the bearings 200 and 202 and carries a keying block 208 in engagement with the keying plate 204 to prevent rotation of the sleeve 206 with respect to the casting 196. This sleeve 206 also carries a roller block 210 on its lower end which in turn is provided with a roller 212. This roller 212 is normally in engagement with a lower cam 214 (FIGS. 3, 11 and 12) and an upper cam 215 adjacent stations 33—35 and 80—82 mounted by means of a bracket 216 to the stationary portions of the machine frame (FIG. 12). The lower cam 214 is secured by means of a bracket 220 (FIG. 11) to an upright or stanchion 222 upstanding from the floor or bedplate portions of the machine frame.

A head carrying shaft 230 is reciprocable within the sleeve 206 and carries a pair of spring mounting plates 232 (FIGS. 11 and 12) on its lower end and flanged contact and lead supporting plate 234 on the upper end thereof. Springs 236 extend from suitable pins protruding from the keying plate 208 on the sleeve 206 to suitable pins outstanding from the spring supporting plates 232.

Each of the lower basing heads 20 has a suitably flanged cup-like body 238 (FIG. 11) provided with a removable supporting insert 239 having one contact opening, in this case, for the contact 102 of a base 27.

It will be understood from a consideration of FIG. 11, that the contact 102 of the base 27 of the lamp 26 projects through the contact aperture in the base insert 239 and into a radial slot 240 provided in the head supporting plate 234 (FIGS. 11 and 13). As shown particularly in FIGS. 12 and 13, a counterweighted contact lever 242 is pivoted at 244 on a suitable pin on the plate 234 and through its weight is held in normally upward position in engagement with the lower contact 102 of a base 27 (FIG. 11). A flexible connector 246 connects the contact lever 242 to a contact brush mounting rod 248 secured by a bracket 250 to the channel 186. A resilient spring biased contact brush 252 on the rod 248 (FIG. 13) is held in normally spring biased engagement with a lower bus bar 254 (FIGS 3, 11 and 13) suitably grounded to the frame of the machine. It will be understood from a consideration of FIG. 3, that this lower bus bar 254 extends throughout the seasoning stations (station 32 through station 79).

Operation of lower basing head

As a lamp 26 indexes from station 31 to station 34 (FIG. 3) the roller 212 on the roller block 210 on the bottom of the head shaft 230 rides up an inclined portion of the lower cam 214, first seating a lower base 27 in a lower basing head 20 at station 32 and finally seating an upper base 27 in an upper basing head 18 at station 33.

As the sleeve 206 and the shaft 230 rise to meet and to seat a base 27 in a lower basing head 20, the springs 236 keep the plates 232 against the bottom surface of the roller block 210. It will be understood that the springs 236 are strong enough to overcome the frictional grip of the jaws 154 of the bulb holder 16 on the envelope of the lamp 26. As the lower basing head 238 and the lamp 26 move upwardly to meet the upper basing head 91, the base 27 is seated therein and the shaft 230 ceases its motion. The sleeve 206 continues to rise due to the action of the cam 214 against the pressure of the springs 236 to compensate for differences in the distance between upper and lower basing heads 18 and 20 and overall length of the lamp 26 and positively seat the upper base 27 in an upper basing head 91. As hereinbefore mentioned the lamp holder jaws 154 (FIGS. 3 and 7–10) are opened between stations 33 and 34 by the cam 174 and the lamp 26 is now held by the heads 18 and 20, thereby permitting the bases 27 to centralize themselves in the heads. It will be understood from a consideration of FIG. 12, that the upper cam 215 extending substantially along the machine at stations 34 and 35 insures positive engagement of the roller 212 with the cam 214.

As shown in FIG. 3, the roller 212 finally engages a releasing cam 260 mounted on a bracket 216 and a declining portion of the lower cam 214 at station 80, riding down said declining portion, lowering the lower head 20 at station 81 and reaching the lowermost position of a lower head 20 at station 82. At station 82 a lamp ejector mechanism removes the lamp 26 (now frictionally held in bulb holder 16) from the upper basing head 18.

Lamp ejector mechanism

The lamp ejector mechanism at station 82 (FIGS. 3, 4, and 11) has the lamp ejector cam 66 on the cam shaft 63 as hereinbefore mentioned. A cam lever 262 (FIG. 11) provided with a cam roller 264 is held in spring-biased engagement with the cam 66 by spring means (not shown). This cam lever 262 (FIG. 11) is carried by an operating rod 266 extending substantially parallel to a leg 30 of the machine frame (FIGS. 4 and 11) and suitably reciprocable in appropriate bushings or bearings (not shown) secured for example, to a leg 30 of the machine frame. A yoke supporting casting 268 (FIGS. 3 and 4) is secured by a bolt 270 (FIG. 4) to a mounting bracket 272 on the side of a leg 30 of the machine frame. The upper portions of the rod 266 are reciprocable in suitably bearing surfaces (not shown) in the yoke casting 268. The upper portion of the operating rod 266 is secured to one end of a yoke (not shown) pivoted on the casting 268 and having its other end connected to a push-down rod 274 (FIG. 4) reciprocable in a suitable guide 276 (FIGS. 3 and 4) of the yoke casting 268. The push-down rod 274 carries a mounting bracket 278 on its lower end which in turn carries a pair of push-down operating fingers 280 (FIGS. 3 and 4) for insertion through the push-down finger opening 94 in the seasoning contact casting 92, through the openings on either side of the bridge 91b (FIG. 6) of the upper base insert 91a against an upper base 27 to remove same and hence the lamp 26 from an upper basing head 18.

It will be understood from a consideration of FIGS. 3, 4, 7 and 11, that when the cam roller 264 (FIG. 11) engages a raised portion of the push-down cam 66 at station 82, the operating rod 266 (FIG. 4) is reciprocated vertically with respect to the frame. The yoke (not shown) on the yoke supporting casting 268 (FIG. 4) reciprocates the operating rod 274 and hence the push-down fingers 280 downwardly to remove a lamp 26 from an upper head 18 as above mentioned and shown in the dotted line position of FIG. 4.

Baking manifolds

It will be understood from a consideration of FIGS. 1 and 5 that upper baking manifolds 290 and 292 (FIG. 4) and lower baking manifolds 296 and 298 (FIG. 11) extend on either side of upper basing heads 18 and lower basing heads 20 respectively from station 35 to station 48.

The upper baking manifold 290 (FIG. 4) is secured by a plurality of bolts (FIG. 4) to a manifold supporting member 300 which extends upwardly and then horizontally for attachment to the bracket 119 carried by the upper portion of a leg 30 of the machine frame contiguous to the upper yoke casing 268 and the frame channel member 32.

The upper manifold 292 is suitably affixed by means of brackets (FIG. 4) to the left hand end when viewed in FIG. 4, of the horizontal member 32 of the machine frame. As shown in FIG. 11, a horizontal brace 310 integrated with a vertical brace or channel 312 provides a support for attachment as by bolts for the lower heating manifold 296. The other heating manifold 298 is connected, as by a bracket, to the leg 30 of the machine frame.

Cooling air manifolds

It will be understood from a consideration of FIGS. 1, 3 and 14 that cooling manifolds 320 and 322 are mounted on either side of the upper basing heads 18 and lower basing heads 20 from station 48 through station 84 and are secured to the frame portions of the combination basing and seasoning machine in a manner similar to the above described mounting means for the heating manifolds.

For example, as shown in FIG. 14, the left hand manifold 320 shown therein is affixed by a retaining plate 324 and suitable bolts to bracket 326 which portion is connected by means (not shown) to the frame portions of the machine. In like manner the right hand cooling manifold is secured by a clamp 328 and suitable bolts to a stationary portion of the frame such as a leg 30. As shown in FIG. 14, the cooling manifolds 320 and 322 are provided with a plurality of jets 330, three in the present showing of FIG. 14 for directing the cooling air directly on the upper and lower bases 27 of a lamp 26 undergoing cooling.

Although a preferred embodiment of the invention has been disclosed, it will be understood that modifications may be made within the spirit and scope of the invention.

I claim:
1. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, and a second conveyor on said frame intermittently movable with said first mentioned conveyor along a coinciding path for at least a portion of its movement and for supporting the bases for said lamp and aligning the same with the respective ends of said lamps, said bulb holders coacting with said second conveyor to release said lamp when said bases are supported on said second conveyor and to again clamp said lamp when said bases are released from said second conveyor.

2. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, and a second conveyor intermittently movable with said first mentioned conveyor about said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads.

3. A conveyor type basing and seasoning machine for fluorescent lamps having bases on either end thereof, comprising a frame, a conveyor intermittently movable about said frame and having a plurality of rotatable bulb holders therein for clamping a lamp along its midpoint and turning it end for end and for guiding the lower end thereof to vertically align said lamp, a second conveyor intermittently movable in synchronism with said first mentioned conveyor about said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads and baking means on said frame adjacent said second conveyor for baking said bases after application to the lamp ends.

4. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, a second conveyor intermittently movable with said first mentioned conveyor about said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads, baking means on said frame adjacent said second conveyor for baking said bases after application to the lamp ends and cooling apparatus on said frame adjacent the path of movement of said second conveyor for cooling said baked lamp bases.

5. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, a second conveyor intermittently movable in synchronism with said first mentioned conveyor about said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads, baking means on said frame adjacent the path of movement of said second conveyor for baking said bases after application to the lamp ends, cooling apparatus on the frame adjacent the path of movement of said second conveyor for cooling said baked lamp bases and seasoning means on said frame adjacent the path of movement of said second conveyor for seasoning said lamps.

6. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, a second conveyor intermittently movable with said first mentioned conveyor on said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads baking means on said frame adjacent said second conveyor for baking said bases after application to the lamp ends, cooling apparatus on said frame adjacent the path of movement of said second conveyor for cooling said baked lamp bases, seasoning means on said frame adjacent the path of movement of said second conveyor for seasoning said lamps, and elevating means on said frame adjacent said path of movement of both said conveyors ahead of said baking means for elevating one of said lower baking heads to seat said lamp in one of said upper basing heads and also seat it in said lower basing head.

7. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, a second conveyor intermittently movable in synchronism with said first mentioned conveyor on said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads, baking means on said frame adjacent said second conveyor for baking said bases after application to the lamp ends, cooling apparatus on said frame adjacent the path of movement of said second conveyor for cooling said baked lamp bases, seasoning means on said frame adjacent the path of movement of said second conveyor for seasoning said lamps, elevating means on said frame adjacent the path of movement of both said conveyors ahead of said baking means for elevating one of said lower baking heads to seat said lamp in one of said upper basing heads and also seat it in said lower basing heads, and bulb holder opening means on said frame contiguous to the path of movement of both said conveyors ahead of said baking means and operable to open said bulb holders.

8. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, a second conveyor intermittently movable in synchronism with said first mentioned conveyor on said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads, baking means on said frame adjacent said second conveyor for baking said bases after application to the lamp ends, cooling apparatus on said frame adjacent the path of movement of said second conveyor for cooling said baked lamp bases, seasoning means on said frame adjacent the path of movement of said second conveyor for seasoning said lamps, elevating means on said frame adjacent the path of movement of both said conveyors ahead of said baking means for elevating one of said lower basing heads to seat said lamp in one of said upper basing heads and also in said lower basing head, bulb holder opening means on said frame contiguous to the path of movement of both said conveyors ahead of said baking means and operable to open said bulb holders, and basing head lowering means adjacent to both said conveyors near the end of said cooling means for lowering said lower basing heads.

9. A conveyor type basing and seasoning machine for fluorescent lamps having bases on either end thereof, comprising a frame, a conveyor intermittently movable about said frame and having a plurality of rotatable bulb holders thereon for clamping a lamp along its midpoint and turning it end for end and for guiding the lower end thereof to vertically align said lamp, a second conveyor intermittently movable in synchronism with said first mentioned conveyor about said frame along a coinciding path for at least a portion of its movement and comprising an upper basing head supporting member provided with a plurality of upper basing heads and a lower basing head supporting member provided with a like number of lower basing heads and for supporting the lamp during a baking, cooling and seasoning operation, said bulb holders coacting with said basing heads to release said lamp when said bases are supported in said basing heads and to again clamp said lamp when said bases are released from said basing heads, baking means on said frame adjacent said second conveyor for baking said bases after application to the lamp ends, cooling apparatus on said frame adjacent the path of movement of said second conveyor for cooling said baked lamp bases, seasoning means on said frame adjacent the path of movement of said second conveyor for seasoning said lamps, elevating means on said frame adjacent the path of movement of both said conveyors ahead of said baking means for elevating one of said lower basing heads to seat said lamp in one of said upper basing heads and also to seat it in said lower basing head, bulb holder opening means on said frame contiguous to the path of movement of both said conveyors ahead of said baking means and operable to open said bulb holders, basing head lowering means adjacent to both said conveyors near the end of said cooling means for lowering said lower basing heads, and lamp removing means contiguous to said second conveyor near the end of said cooling apparatus for removing said lamps from said upper basing heads.

References Cited in the file of this patent

UNITED STATES PATENTS

| | | |
|---|---|---|
| 1,708,756 | Fagan et al. | Apr. 9, 1929 |
| 1,736,766 | Burrows | Nov. 19, 1929 |
| 2,564,839 | Giacchetti | Aug. 21, 1951 |
| 2,661,101 | Mullan et al. | Dec. 1, 1953 |
| 2,720,690 | Mullan et al. | Oct. 18, 1955 |
| 2,764,953 | Mullan et al. | Oct. 2, 1956 |